United States Patent
James et al.

(10) Patent No.: US 10,926,789 B2
(45) Date of Patent: Feb. 23, 2021

(54) STEERING ASSEMBLY

(71) Applicant: SAINT-GOBAIN PERFORMANCE PLASTICS RENCOL LIMITED, Coventry (GB)

(72) Inventors: Neil James, Chepstow (GB); Llewelyn Pickering, Pandy (GB); James K. Burgess, Gloucester (GB); Alfred J. Lethbridge, Exeter (GB); Ciaran Morrison, Bristol (GB); André Gabener, Essen (DE); Sven Muehling, Nettetal (DE); Thiemo Kuesters, Viersen (DE)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 16/715,618

(22) Filed: Dec. 16, 2019

(65) Prior Publication Data
US 2020/0140002 A1    May 7, 2020

Related U.S. Application Data

(63) Continuation-in-part of application No. 16/234,673, filed on Dec. 28, 2018, and a continuation-in-part of
(Continued)

(51) Int. Cl.
*B62D 3/12*    (2006.01)
*F16F 1/18*    (2006.01)
(Continued)

(52) U.S. Cl.
CPC .............. *B62D 3/126* (2013.01); *F16C 29/02* (2013.01); *F16C 35/02* (2013.01); *F16F 1/024* (2013.01);
(Continued)

(58) Field of Classification Search
CPC . B62D 3/02; B62D 3/12; B62D 3/123; B62D 3/126; B62D 7/163; F16C 29/02;
(Continued)

(56) References Cited

U.S. PATENT DOCUMENTS 1,384,173 A * 7/1921 Wikander .............. F16C 17/18
384/280
3,197,243 A    7/1965 Brenneke
(Continued)

FOREIGN PATENT DOCUMENTS

| JP | 5347777 B2 * | 11/2013 | ............. B62D 3/123 |
| WO | 2016060660 A1 | 4/2016 | |
| WO | 2019129867 A1 | 7/2019 | |

OTHER PUBLICATIONS

Innternational Search Report and Written Opinion for PCT/EP2018/097107, dated Apr. 11, 2019, 12 pages.

*Primary Examiner* — Adam D Rogers
(74) *Attorney, Agent, or Firm* — Abel Schillinger, LLP; Chi Suk Kim

(57) ABSTRACT

A steering assembly including an inner steering member; an outer steering member; a leaf spring disposed between the inner steering member and the outer steering member and adapted to bias the inner steering member, wherein the leaf spring comprises an inner portion and a plurality of outer portions, wherein the outer portions comprise end portions of the leaf spring that are folded over such that the outer portions overlie the inner portion, forming a folded edge; and a low friction layer supported by the leaf spring.

19 Claims, 11 Drawing Sheets

Related U.S. Application Data application No. 16/234,676, filed on Dec. 28, 2018, now Pat. No. 10,507,751.

(60) Provisional application No. 62/611,601, filed on Dec. 29, 2017, provisional application No. 62/611,626, filed on Dec. 29, 2017.

(51) Int. Cl.

| | | |
|---|---|---|
| *F16H 55/26* | (2006.01) | |
| *F16H 19/02* | (2006.01) | |
| *F16C 35/02* | (2006.01) | |
| *F16F 1/20* | (2006.01) | |
| *F16F 1/02* | (2006.01) | |
| *F16C 29/02* | (2006.01) | |
| *F16H 55/28* | (2006.01) | |
| *F16H 19/04* | (2006.01) | |
| *F16H 57/12* | (2006.01) | |

(52) U.S. Cl.
CPC ................ *F16F 1/185* (2013.01); *F16F 1/20* (2013.01); *F16H 55/283* (2013.01); *F16C 2326/24* (2013.01); *F16H 19/04* (2013.01); *F16H 2057/127* (2013.01)

(58) Field of Classification Search
CPC ........ F16C 33/04; F16C 33/20; F16C 33/203; F16C 35/02; F16C 2208/20; F16C 2326/24; F16C 2361/61; F16F 1/024; F16F 1/185; F16F 1/20; F16F 2224/0208; F16H 19/04; F16H 55/26; F16H 55/283; F16H 2055/281; F16H 2057/127
See application file for complete search history.

(56) References Cited

U.S. PATENT DOCUMENTS

| | | | |
|---|---|---|---|
| 3,498,672 A | | 3/1970 | Leichtl |
| 4,263,817 A | * | 4/1981 | Taig ................ B62D 3/12 74/422 |
| 4,271,716 A | * | 6/1981 | Carduner ........... B62D 3/123 74/422 |
| 4,650,250 A | | 3/1987 | Kriigener et al. |
| 5,507,203 A | * | 4/1996 | Audibert ............ B62D 1/185 464/162 |
| 5,788,250 A | | 8/1998 | Masters et al. |
| 6,427,552 B1 | * | 8/2002 | Sahr .................. B62D 3/123 180/427 |
| 6,539,821 B2 | * | 4/2003 | Bugosh ............... B62D 3/123 74/422 |
| 7,434,886 B2 | | 10/2008 | Yamada |
| 8,863,599 B2 | * | 10/2014 | Crossman ........... B62D 3/123 74/422 |
| 8,991,927 B2 | | 3/2015 | Wisniewski et al. |
| 9,446,692 B2 | | 9/2016 | Hagan et al. |
| 10,174,792 B2 | * | 1/2019 | James .................. F16D 1/0835 |
| 10,507,751 B2 | * | 12/2019 | James .................. B60N 2/897 |
| 2003/0205925 A1 | | 11/2003 | Cord |
| 2006/0087167 A1 | | 4/2006 | Craft et al. |
| 2007/0163375 A1 | * | 7/2007 | Counts ................ F16H 55/283 74/422 |
| 2008/0156573 A1 | * | 7/2008 | Amada ................ B62D 3/123 180/428 |
| 2011/0247891 A1 | * | 10/2011 | Meyer .................. H02K 5/24 180/443 |
| 2013/0206930 A1 | | 8/2013 | Gottwald et al. |
| 2015/0114549 A1 | * | 4/2015 | Slayne ................. F16C 27/02 156/220 |
| 2018/0283457 A1 | * | 10/2018 | Plioska ................ F16C 29/12 |
| 2019/0202329 A1 | | 7/2019 | James et al. |
| 2019/0202489 A1 | * | 7/2019 | Muehling ............ F16H 55/283 |

\* cited by examiner

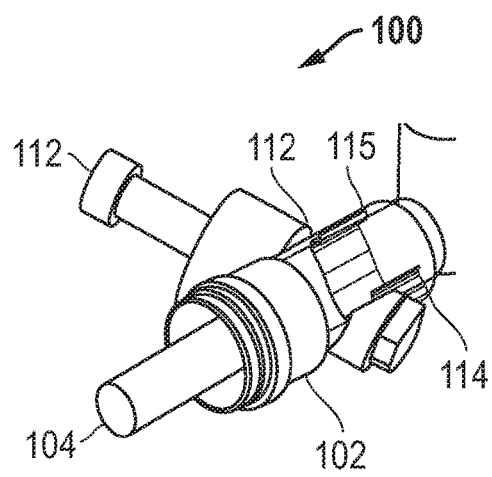
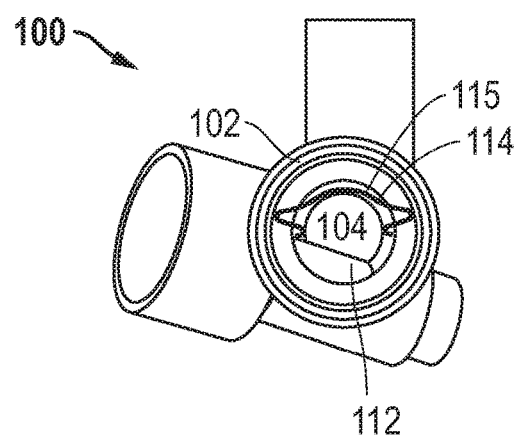
FIG. 8A        FIG. 8B
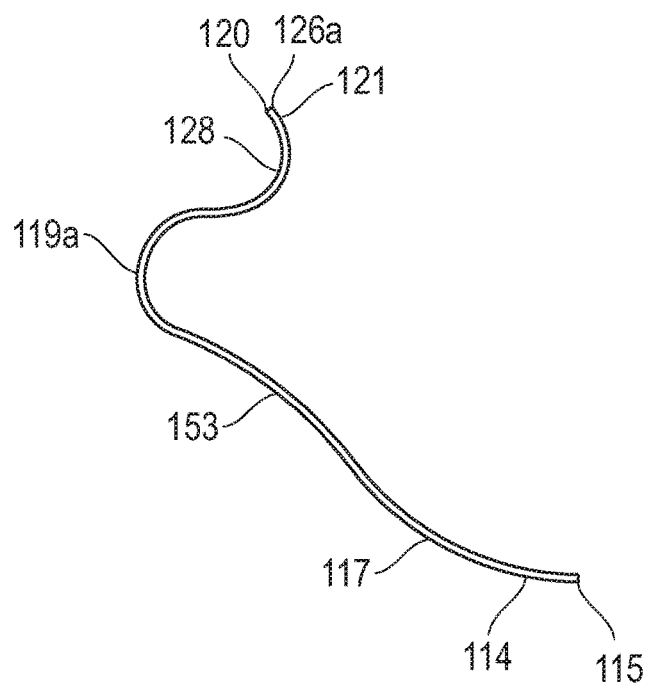
FIG. 9

STEERING ASSEMBLY

CROSS-REFERENCE TO RELATED APPLICATION(S)

This application is a continuation-in-part of U.S. patent application Ser. No. 16/234,676, entitled "BEARING FOR USE IN SEAT BACK ASSEMBLIES," by Neil JAMES et al., filed Dec. 28, 2018, which claims priority under 35 U.S.C. § 119(e) to U.S. Patent Application No. 62/611,626 entitled "BEARING FOR USE IN SEAT BACK ASSEMBLIES," by Neil JAMES et al., filed Dec. 29, 2017, and this application is a continuation-in-part of U.S. patent application Ser. No. 16/234,673, entitled "STEERING ASSEMBLY," by Sven MUEHLING et al., filed Dec. 28, 2018, which claims priority under 35 U.S.C. § 119(e) to U.S. Patent Application No. 62/611,601 entitled "STEERING ASSEMBLY," by Sven MUEHLING et al., filed Dec. 29, 2017, which are assigned to the current assignee hereof and incorporated herein by reference in their entireties.

BACKGROUND

Field of the Disclosure

The present disclosure is directed to bearing and bearing assemblies, particularly the present disclosure is directed to a steering assembly.

Description of the Related Art

Many vehicles use a steering assembly including a rack and pinion steering system to translate motion from the steering wheel to the turning wheels on the road. In a typical rack and pinion steering system, a steering wheel is mechanically coupled to a pinion gear via a rack shaft. The pinion gear can include gear teeth that are mated with teeth on a rack shaft. As the pinion gear rotates, the rotational motion is translated into linear motion at the rack shaft. The rack shaft is connected to a tie rod at each wheel assembly, and as the rack shaft moves linearly, the tie rods translate in order to rotate the wheel assemblies and turn the vehicle.

To assure proper lash between the pinion and the rack shaft, a steering yoke assembly can be used to provide a biasing force that forces the rack shaft into the pinion gear. The yoke may also be referred to as a "yoke assembly," "yoke slipper," or "puck." The rack shaft (typically steel) slides along the yoke when the pinion gear is rotated. Proper fit between the pinion gear and the rack shaft is essential to any rack and pinion steering system.

Accordingly, the industry continues to need improvements in steering assemblies.

BRIEF DESCRIPTION OF THE DRAWINGS

The present disclosure can be better understood, and its numerous features and advantages made apparent to those skilled in the art by referencing the accompanying drawings.

FIG. 8A includes a perspective view of a steering assembly in accordance with an embodiment.

FIG. 8B includes a perspective view of a steering assembly in accordance with an embodiment.

FIG. 9 includes a close-up view of a bearing for use in a steering assembly in accordance with an embodiment.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing assembly or steering assembly arts.

Figure 1:
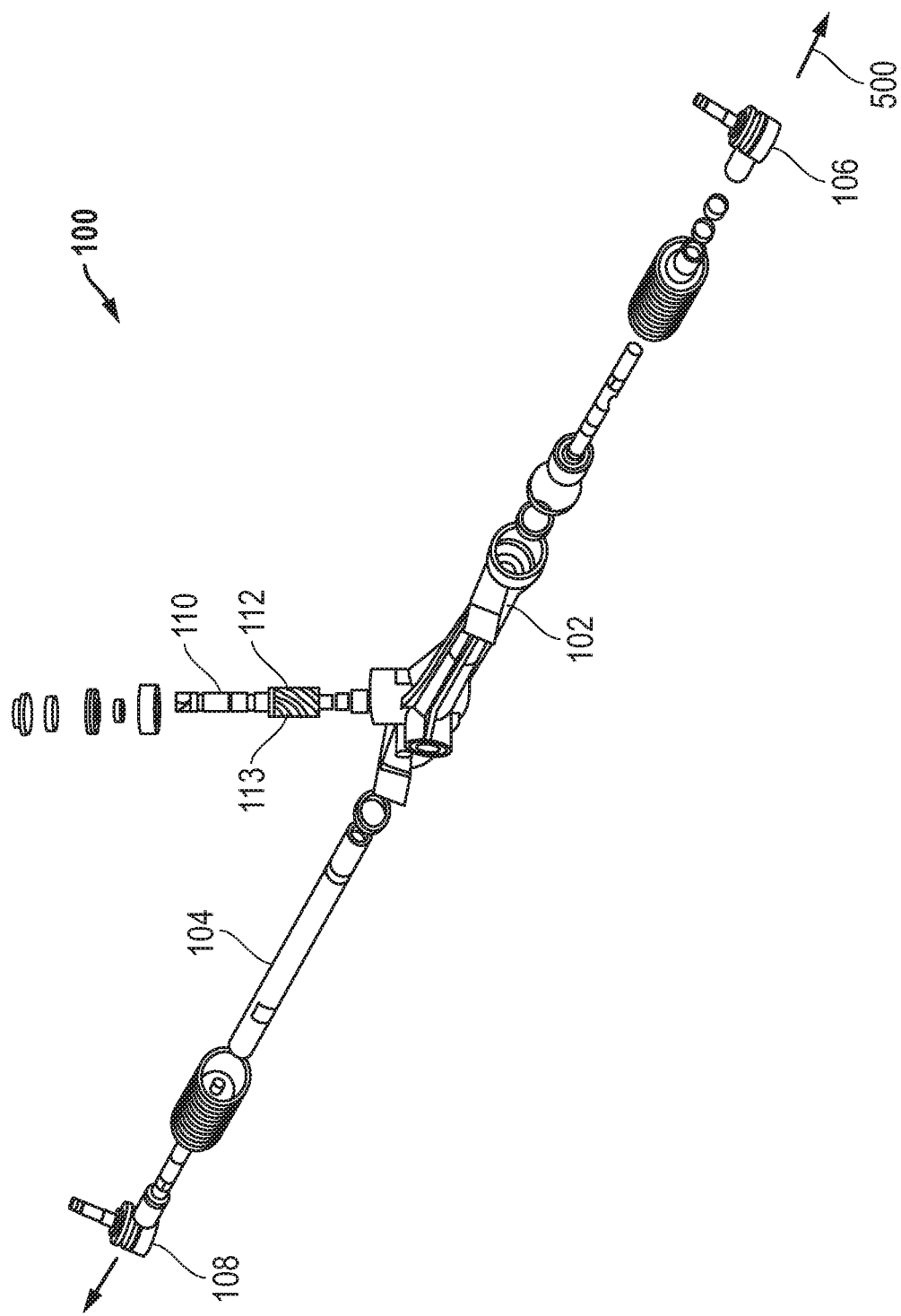
FIG. 1 includes an exploded perspective view of a steering assembly in accordance with an embodiment.

Referring initially to FIG. 1, a steering assembly is illustrated and is generally designated 100. As depicted in FIG. 1, the steering assembly 100 can include an outer steering member or steering housing 102. An inner steering member or rack shaft 104 can extend through the outer member 102 and the inner steering member 104 can be connected to a first tie rod 106 and a second tie rod 108. The inner steering member 104 may have a plurality of teeth 107. The inner steering member 104 may be adapted to translate relative to the outer member 102. The steering assembly 100 may further include a shaft 110 that includes a pinion 112. The pinion 112 may be adapted to engage the inner steering member 104. The pinion 112 may include a helical pinion gear having a plurality of teeth 113 which can extend into the outer member 102 generally or substantially perpendicular to the inner steering member 104. In a number of embodiments, the plurality of teeth 113 of the pinion 112 may translate the inner steering member 104 resulting from the engagement of the teeth 113 of the pinion 112 with the teeth 107 of the inner steering member 104. In a number of embodiments, a bearing component 114 can be installed within the outer member 102 in order to provide a force against the inner steering member 104. In a number of embodiments, the bearing component 114 may provide a biasing force for maintaining the inner steering member 104 in engagement with the pinion gear 112.

Figure 2A:
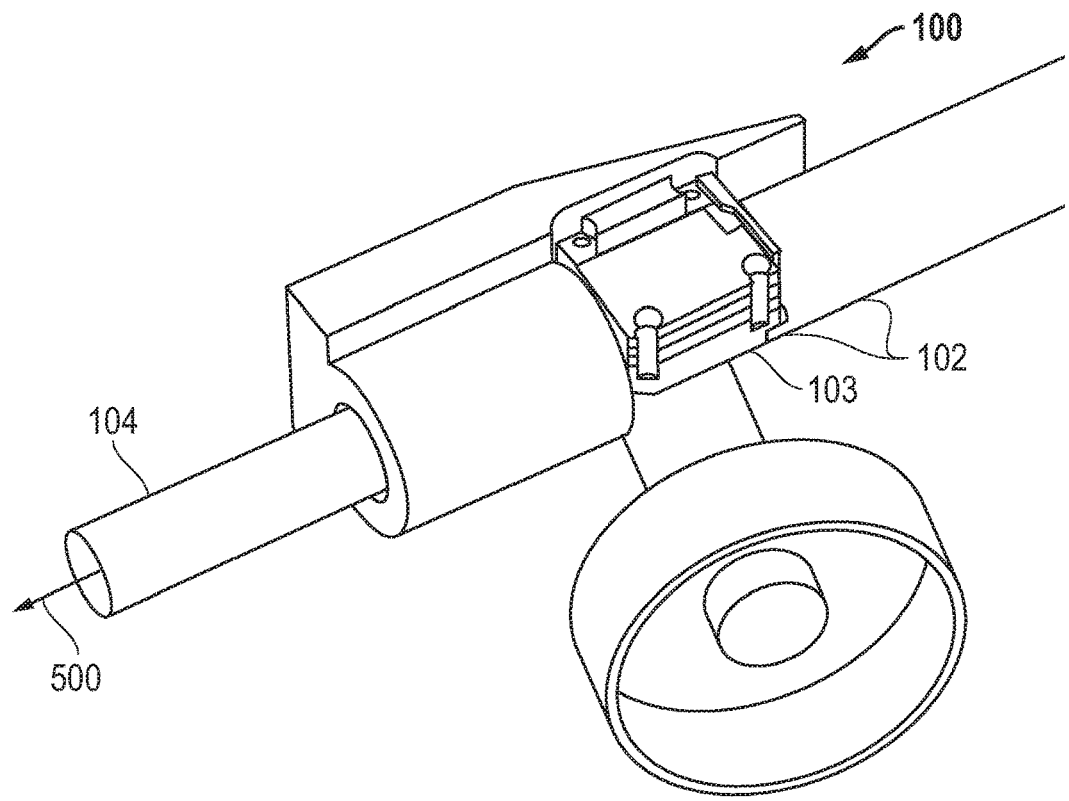
FIG. 2A includes a perspective view of a steering assembly in accordance with an embodiment.
Figure 2B:
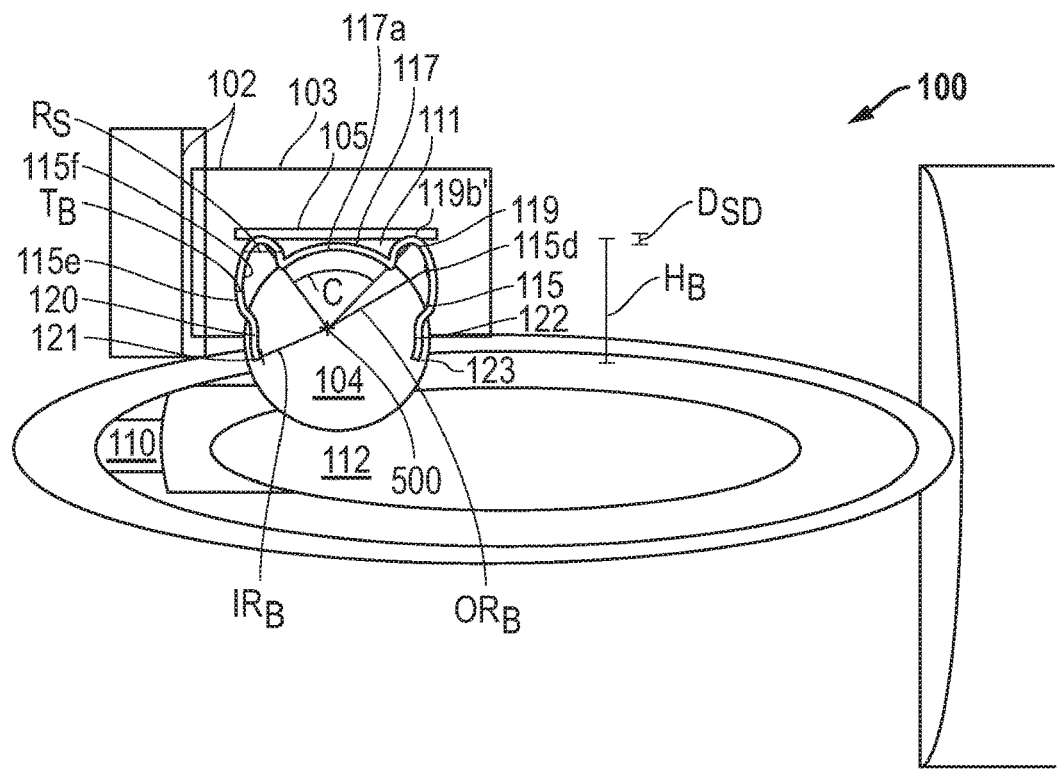
FIG. 2B includes a cross-sectional view of a steering assembly in accordance with an embodiment.
Figure 2C:
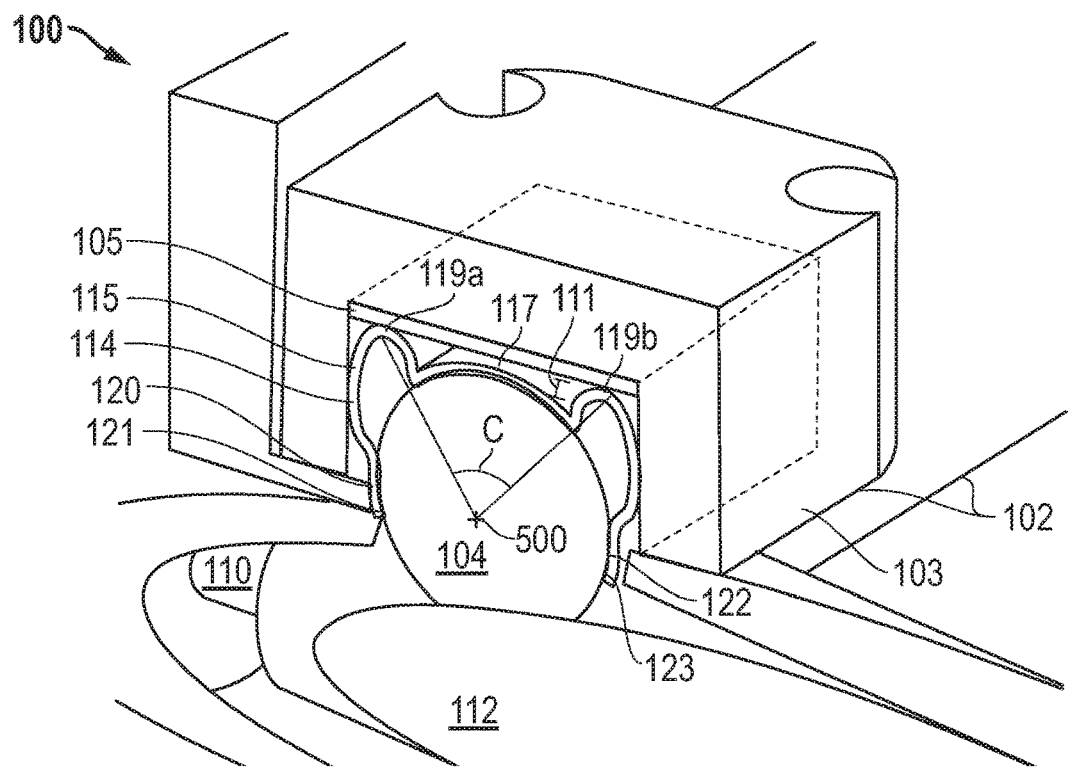
FIG. 2C includes a perspective cross-sectional view of a steering assembly in accordance with an embodiment.
Figure 2D:
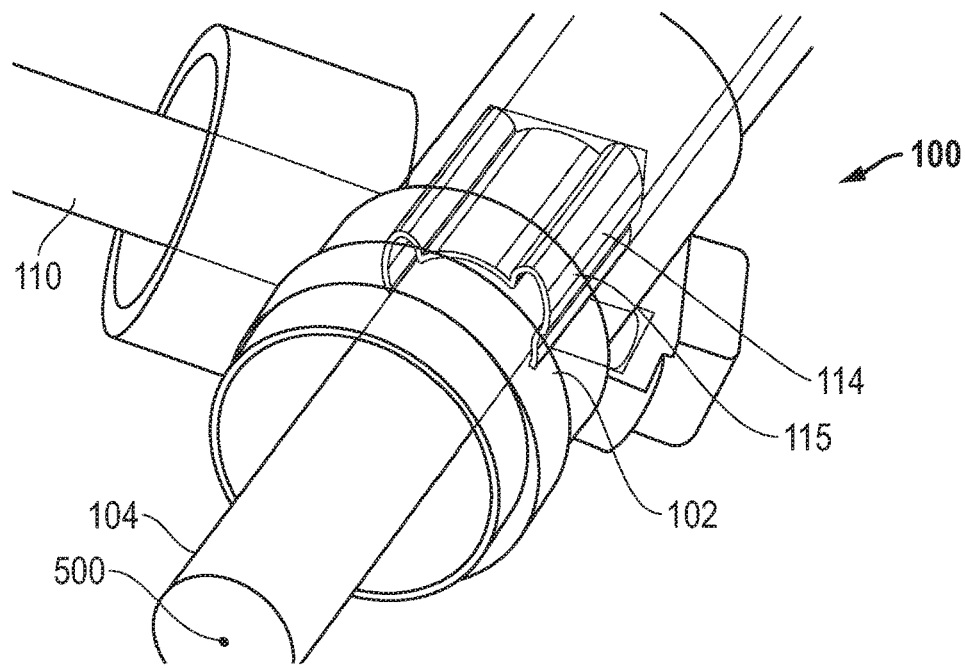
FIG. 2D includes a perspective view of a steering assembly in accordance with an embodiment.
Figure 2E:
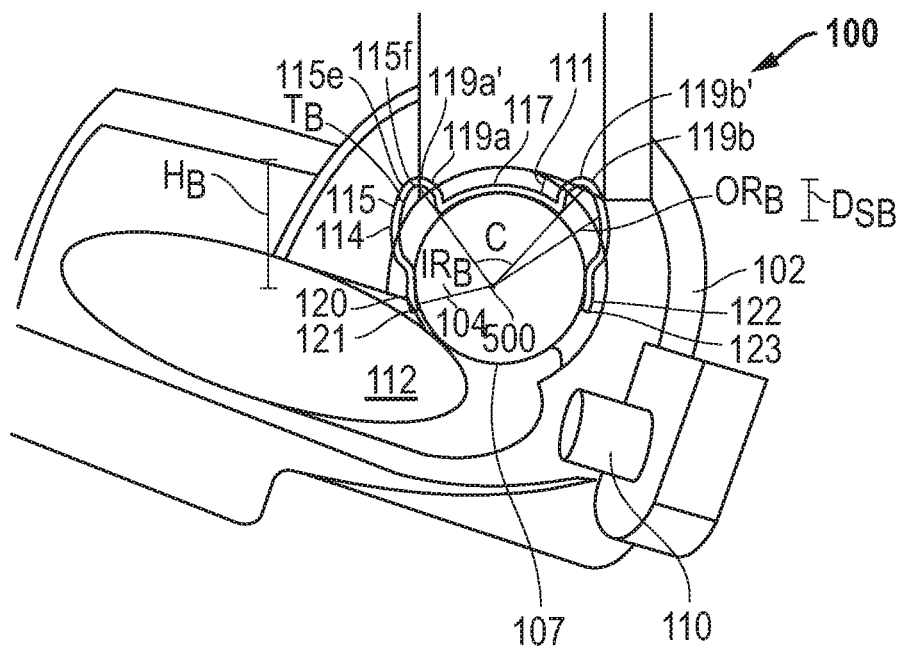
FIG. 2E includes a cross-sectional view of a steering assembly in accordance with an embodiment.
Figure 2F:
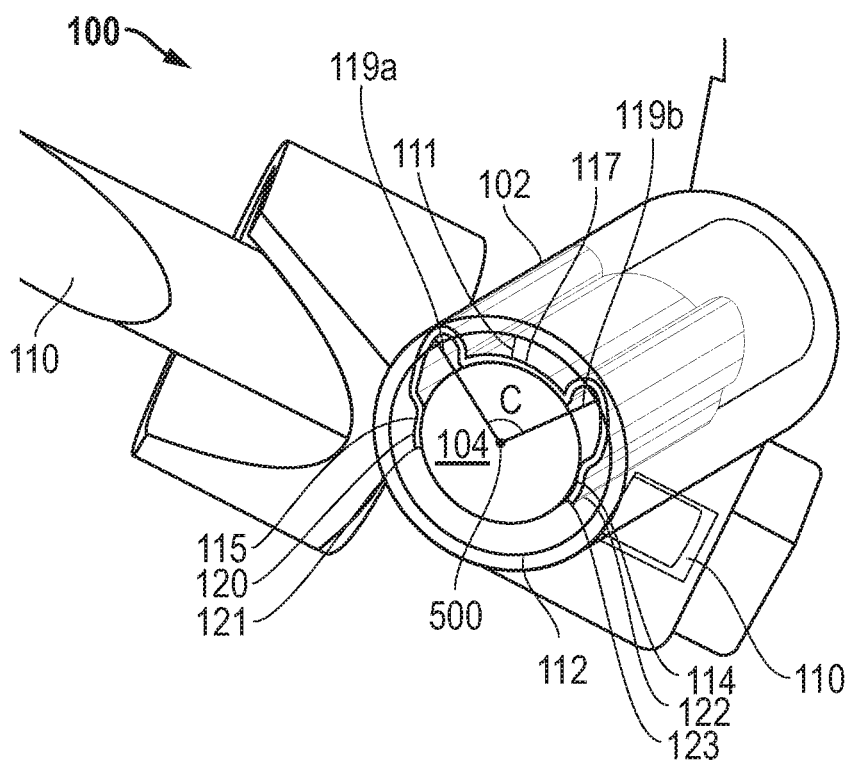
FIG. 2F includes a perspective cross-sectional view of a steering assembly in accordance with an embodiment.

Specifically, as shown in FIGS. 2A-2F, the helical pinion gear 112 can be mated with the inner steering member 104. The bearing component 114 may be disposed around and/or share a common axial position with at least a portion of the inner steering member 104. The bearing component 114 may be disposed around and/or share a common axial position with the pinion 112. As used herein, "common axial position" means that the bearing component 114 may at least partially underlie a portion of the inner steering member 104 or the pinion 112. In a number of embodiments, the bearing component 114 can wrap at least partially around an outer sidewall of the inner steering member 104 and the bearing component 114 may exert a force against the inner steering member 104 to force engagement with the pinion. The engagement may be in the radial or axial direction. In a number of embodiments, the bearing component 114 can be biased toward the outer sidewall of the inner steering member 104 by the outer member 102. In a number of embodiments, the outer member may include an outer member insert 103. In a number of embodiments, the outer member insert 103 may include an outer member platform 105 may rest against the bearing component 114. In a number of embodiments, the platform 105 may provide a force against the bearing 115. In a number of embodiments, as shown in FIGS. 2D-2F, the assembly 2 may not include a platform 105 or an outer member insert 103, and the bearing component 114 may be biased against the outer member 102.

In a number of embodiments, as shown in FIGS. 2A-2F and 4A-4C, the bearing component 114 may include a bearing 115. The bearing 115 may have a generally arcuate shape. In a number of embodiments, the bearing 115 may include a support region 117 and a plurality of feet 119. In a number of embodiments, the support region 117 may be adapted to maintain contact to the inner steering member 104. As stated above, the bearing 115 may include a plurality of feet including, such as a first foot 119a and a second foot 119b spaced apart from each other such that the support region 117 extends therebetween. In a number of embodiments, the first foot 119a and second foot 119b may be positioned along the circumference of the bearing component 114 or bearing 115 at an arc distance defined by a central angle C, defined herein as the circumferential angle (measured from the geometric center of the rack 104 at the axis 500) between planar radial segments that pass through the first foot 119a and the second foot 119b at a point of contact between the respective feet 119a, 119b, and the housing 102. In a number of embodiments, the first foot 119a and second foot 119b may be positioned along the circumference of the bearing component 114 or bearing 115 at an arc distance defined by a central angle C, wherein the central angle C is no greater than 180°, such as no greater than 120°, such as no greater than 90°, such as no greater than 45°, or such as no greater than 30°. In a number of embodiments, the central angle C may be no less than 15°, such as no less than 30°, such as no less than 45°, such as no less than 60°, or such as no less than 90°. In a number of embodiments, at least one of the first foot 119a or the second foot 119b may have an arcuate cross-sectional profile as viewed in a cross-section perpendicular to the axis 500. In a number of embodiments, at least one of the first foot 119a or the second foot 119b may extend in a radial direction along an axis 500 of the inner steering member 104. In a number of embodiments, the at least one of the first foot 119a or the second foot 119b may extend in a radial direction beyond the support region 117 along an axis 500 of the inner steering member 104. In such an arrangement the bearing 115 may exert a force against the inner steering member 104 when disposed around a portion of the inner steering member 104 within the outer member 102 of the steering assembly 100. In a number of embodiments, the first foot 119a may have a rounded or arcuate end portion 119a' that contacts the outer member 102. In a number of embodiments, the second foot 119b may have a rounded or arcuate end portion 119b' that contacts the outer member 102. In a number of embodiments, the first foot 119a may have a pointed or flat end portion 119a' that contacts the outer member 102. In a number of embodiments, the second foot 119b may have a pointed or flat end portion 119b' that contacts the outer member 102.

The steering assembly components (including any one of the outer member/steering housing 102, inner steering member 104, first tie rod 106, second tie rod 108, shaft 110, or pinion 112) may be made from metal, polymer, or a combination thereof. The metal can be a single metal, such as aluminum, or a metal alloy such as steel, aluminum alloy, brass, etc. The polymer may be a thermoplastic polymer. The thermoplastic polymer may be a polyamide thermoplastic, such as polycaprolactam. Further, the thermoplastic can be polyoxymethylene (POM). Additionally, the thermoplastic polymer can be a polyethylene thermoplastic such as high-density polyethylene (HDPE). The steering assembly components (including any one of the outer member/steering housing 102, inner steering member 104, first tie rod 106, second tie rod 108, shaft 110, or pinion 112) may be made from die cast metal or injection molded plastic using molding or drawing techniques.

Referring to FIGS. 2A-2F, the feet 119a, 119b may be configured to contact the outer member 102 in an assembled state of the steering assembly 100. The feet 119a, 119b may be configured to contact the outer member platform 105. In a number of embodiments, the support region 117 may be spaced apart from the outer member 102 by a gap 111.

In a number of embodiments, the support region 117 may have a minimum radius of curvature, $R_S$. The minimum radius of curvature $R_S$ may be defined herein as the smallest radius of curvature that exists along the support region 117 as viewed in a cross-section perpendicular to the axis 500. In a number of embodiments, at least one of the first foot 119a or second foot 119b may have a minimum radius of curvature $R_F$. The minimum radius of curvature $R_F$ may be defined herein as the smallest radius of curvature that exists along at least one of the first foot 119a or second foot 119b as viewed in a cross-section perpendicular to the axis 500. In a number of embodiments, the minimum radius of curvature of the first and/or second feet 119a, 119b $R_F$ may be less than the minimum radius of curvature $R_S$ of the support region 117. In a number of embodiments and $R_F$ can be ≤0.8 $R_S$ such as ≤0.5 $R_S$, ≤0.3 $R_S$, or ≤0.1 $R_S$. Further, $R_S$ can be ≤infinity. It can be appreciated that $R_S$ can be within a range between and including any of the values for $R_S$ values described herein.

Figure 5:
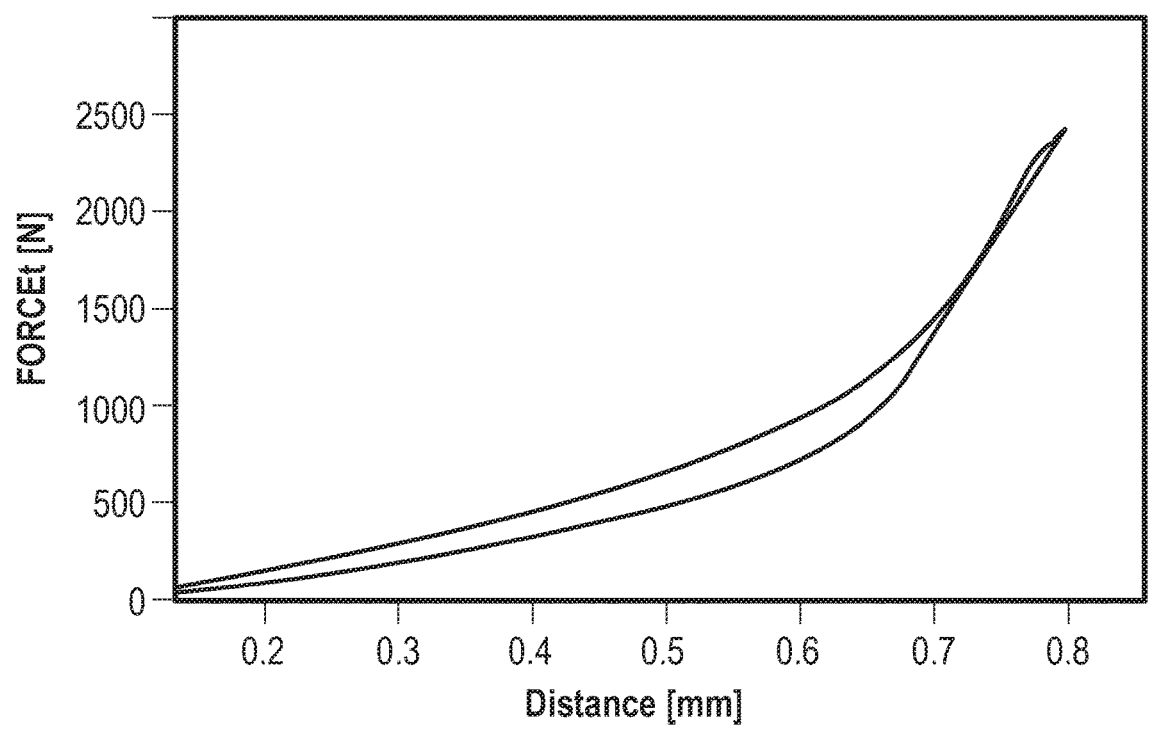
FIG. 5 includes a graph of the length of a support region versus the spring force provided by a bearing component or bearing according to an embodiment of the invention.

In a number of embodiments, as shown in FIG. 2B, the bearing 115 may have a spring distance $D_{SD}$ defined as a gap between a radially outermost point of the support region 117 and a line tangent to the radially outermost points of the first and second feet 119a, 119b. In a number of embodiments, $D_{SD}$ may be within a range of about 0.1 mm to about 20 mm. In a number of embodiments, the support region 117 may be adapted to provide a spring force, such as a spring force greater than 50 N, such as greater than 100 N, such as greater than 250 N, or such as greater than 300 N. The spring force may be between about 200 and about 2500 N as shown in FIG. 5. In other embodiments, the spring force may be greater than 300 N such as up to at least 10 kN.

As shown in FIG. 5, the use of the spring distance can be adapted to provide a spring-back force depending on the length of the support region 117.

Figure 4A:
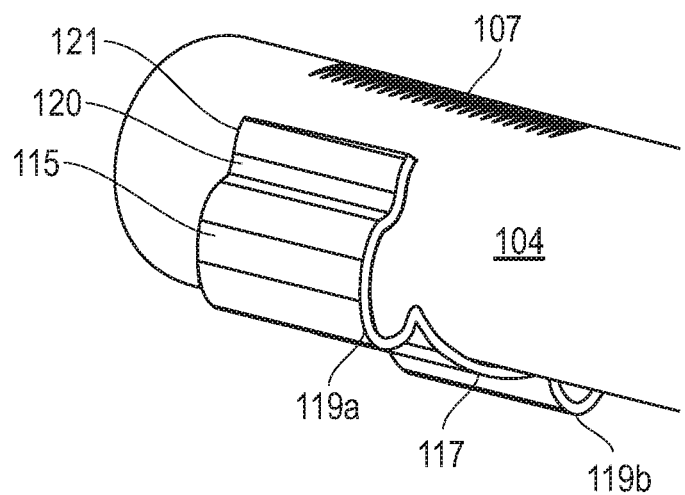
FIG. 4A includes a perspective view of a steering assembly in accordance with an embodiment.
Figure 4B:
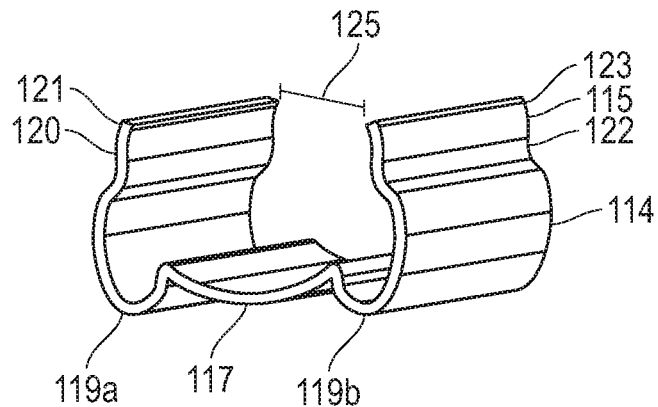
FIG. 4B includes a perspective view of a bearing for use in a steering assembly in accordance with an embodiment.
Figure 4C:
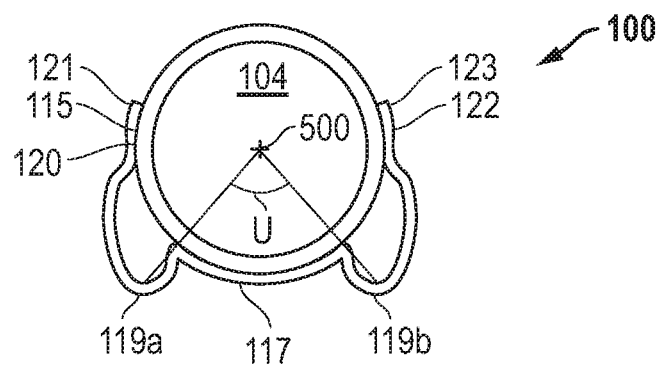
FIG. 4C includes an end view of a steering assembly in accordance with an embodiment.

Referring back to FIGS. 2A-2F and 4A-4C, the bearing 115 or bearing component 114 may include a first edge 121 and a second edge 123 that forms an axial gap 125. The axial gap 125 may extend along the length of the bearing 115 or bearing component 114. In a number of embodiments, as shown in FIGS. 4A and 4C, the bearing 115 or bearing component 114 may have a first side region 120 and a second side region 122 that terminate at the first edge 121 and second edge 123 respectively.

In a number of embodiments, when an operator of the vehicle in which the steering assembly 100 turns a steering wheel of the vehicle, the shaft 110 rotates causing the pinion gear 112 to rotate therewith. As the pinion gear 112 rotates, the inner steering member 104 can slide either in or out of the page as illustrated in FIGS. 2B and 2E. The inner steering member 104 can slide against the stationary bearing component 114 or bearing 115 which maintains a biasing force that keeps the pinion gear 112 and the inner steering member 104 meshed together via their respective teeth 113, 107.

In a number of embodiments as shown in FIGS. 2B and 2E, the bearing component 114 or bearing 115 may have an outer radius $OR_B$, from the central axis 500 to an outer radial end 115d in one of the feet 119, and $OR_B$ can be ≥0.5 mm, such as ≥1 mm, ≥5 mm, ≥10 mm, ≥15 mm, or ≥20 mm. The $OR_B$ can be ≤45 mm, such as ≤40 mm, such as ≤35 mm, such as ≤30 mm, ≤20 mm, ≤15 mm, ≤10 mm, or ≤5 mm.

In a number of embodiments as shown in FIGS. 2B and 2E, the bearing component 114 or bearing 115 may have an inner radius $IR_B$, from the central axis 500 to a first or second edge 121, 123, and $IR_B$ can be ≥1 mm, such as ≥5 mm, ≥7.5 mm, ≥10 mm, ≥15 mm, or ≥20 mm. The inner radius $IR_B$ can be ≤20 mm, such as ≤15 mm, ≤10 mm, ≤7.5 mm, ≤5 mm, or ≤1 mm.

Figure 3:
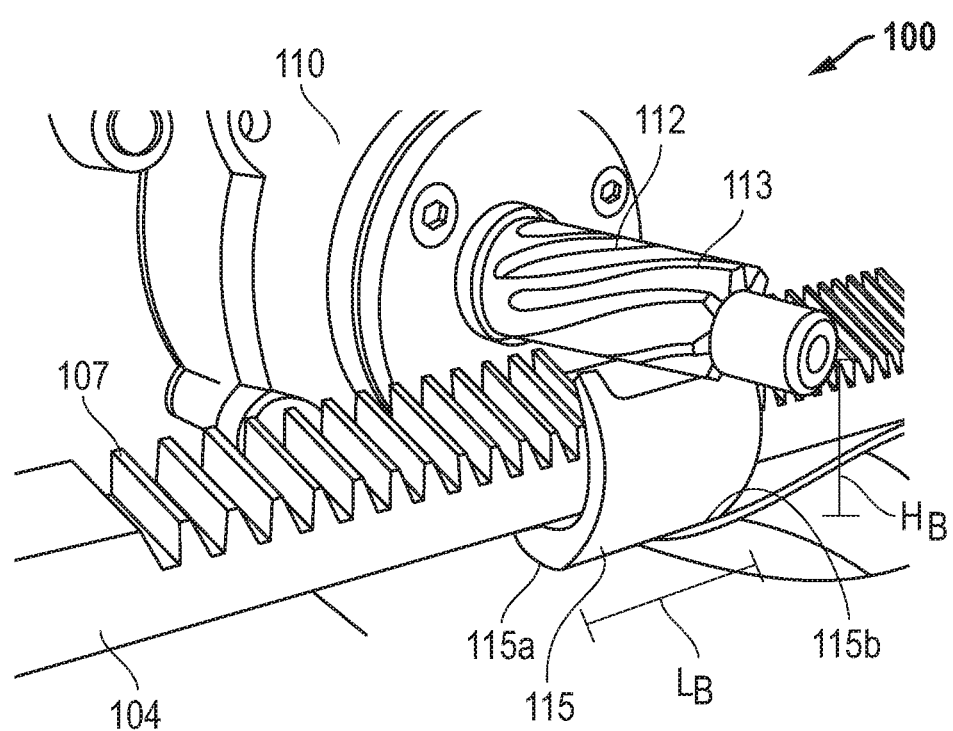
FIG. 3 includes a cross-sectional view of a steering assembly without an outer member by way of non-limiting example in accordance with an embodiment.

In a number of embodiments as shown in FIG. 3, the bearing component 114 or bearing 115 may have a length $L_B$ measured between a first axial end 115a to a second end 115b. The length $L_B$ can be ≥1 mm, such as ≥5 mm, ≥7.5 mm, ≥10 mm, ≥15 mm, or ≥20 mm. The length $L_B$ can be ≤20 mm, such as ≤15 mm, ≤10 mm, ≤7.5 mm, ≤5 mm, or ≤1 mm.

In a number of embodiments as shown in FIGS. 2B, 2E, and 3, the bearing component 114 or bearing 115 may have height $H_B$ measured between a first or second edge 121, 123 to a base of a first or second foot 119a, 119b. The height $H_B$ can be ≥1 mm, such as ≥5 mm, ≥7.5 mm, ≥10 mm, ≥15 mm, or ≥20 mm. The height $H_B$ can be ≤20 mm, such as ≤15 mm, ≤10 mm, ≤7.5 mm, ≤5 mm, or ≤1 mm.

In a number of embodiments as shown in FIGS. 2B and 2E, the bearing component 114 or bearing 115 can have an overall thickness, $T_B$ from a first side 115e to a second side 115f of the bearing 115. The thickness $T_B$ can be ≥0.5 mm, ≥0.75 mm, ≥1 mm, ≥2 mm, ≥5 mm, or ≥10 mm. The thickness $T_B$ can be ≤10 mm, such as ≤7.5 mm, ≤5 mm, ≤2.5 mm, or ≤1 mm.

In a number of embodiments, as shown in FIG. 9, the bearing component 114 or bearing 115 can include a plurality of feet 119a, 119b oriented about 80-120° to either side of the support region 117. In these embodiments, the support region may include an arcuate section 153 between the foot 119a and the support region 117. Further, toward the first edge of the bearing component 114 or bearing 115 beyond the feet 119a, 119b, an intermediate section 128a may be formed on the bearing component 114 or bearing 115. The intermediate section 128a may be curved or straight. Further, the first side region 120 may form a curled edge 126a on the first edge 121 of the bearing component 114 or bearing 115.

Figure 7A:
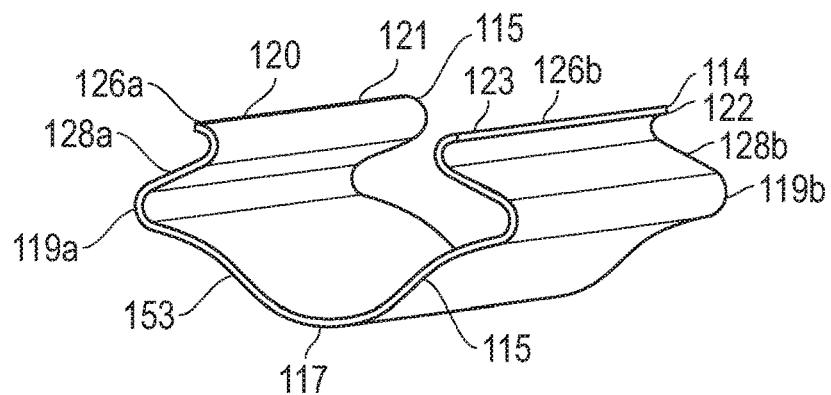
FIG. 7A includes a perspective view of a bearing for use in a steering assembly in accordance with an embodiment.
Figure 7B:
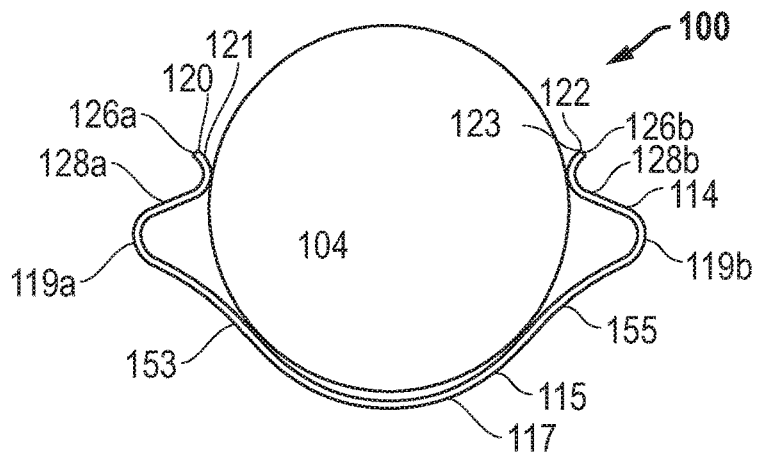
FIG. 7B includes an end view of a steering assembly in accordance with an embodiment.
Figure 7C:
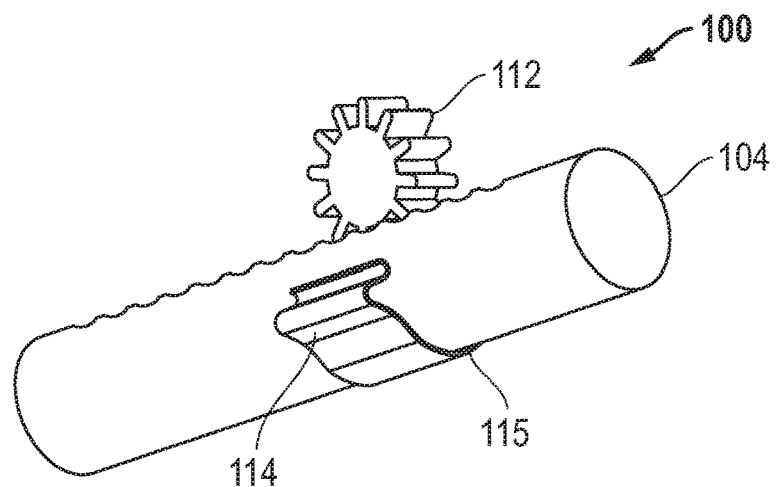
FIG. 7C includes a perspective view of a steering assembly in accordance with an embodiment.

In a number of embodiments, as shown in FIGS. 7A-7C, the bearing component 114 or bearing 115 can include a plurality of feet 119a, 119b oriented approximately 90° to either side of the support region 117. In these embodiments, the support region may include a plurality of arcuate sections 153, 155. Further, toward the first edge and second edge of the bearing component 114 or bearing 115 beyond the feet 119a, 119b, a plurality of straight sections 128a, 128b may be formed on the bearing. Further, the first side region 120 and the second side region 122 may form a curled edge 126a, 126b on the first edge 121 and second edge 123 of the bearing component 114 or bearing 115.

Figure 10:
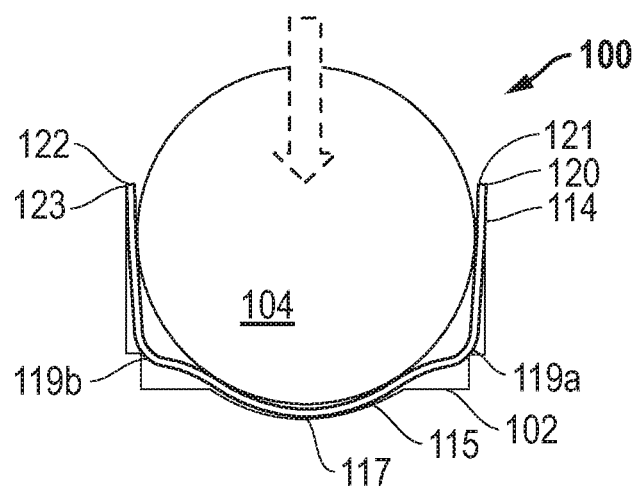
FIG. 10 includes a steering assembly according to an embodiment of the invention.

As shown in FIGS. 8A-8B, the bearing component 114 or bearing 115 may be placed within the assembly 100 between inner steering member 104 and the outer steering member 102 such that it is disposed around a portion of the inner steering member 104. Further, the bearing component 114 or bearing 115 may contact outer steering member 102. The design of this embodiment gives us spring behavior such that at low load, there is line contact between the bearing component 114 or bearing 115 and the inner steering member 104 and as the load increases, the bearing component 114 or bearing 115 gets deformed or pressed into full contact with the inner steering member 104 as the feet 119a, 119b will roll or slide in the space or void between the inner steering member 104 and the outer steering member 102, depending on the shape of the space or void between the inner steering member 104 and the outer steering member 102. In some embodiments, the feet 119a, 119b along with the arcuate sections 153, 155 will deform or straighten within the space or void to maintain full contact with the inner steering member 104. By non-limiting example, FIG. 10 shows two steps formed in the outer steering member 102 such that the feet 119a, 119b will roll or slide to maintain full contact with the inner steering member 104. The length and shape of the feet 119a, 119b (and the bearing component 114 or bearing 115 itself) may be modified to meet this relationship depending on the shape of the space or void between the inner steering member 104 and the outer steering member 102. That is, the shape of the bearing component 114 or bearing 115 may be modified to meet the shape of the space or void between the inner steering member 104 and the outer steering member 102 to change to full contact with the inner steering member 104. As shown in FIG. 10, the support region 117 may contact the outer steering member 102, which may include a groove adapted to house the shape of the support region 117. In a number of embodiments, as shown for FIGS. 7A-7C, the minimum radius of curvature of the first and/or second feet 119a, 119b $R_F$ may be less than the minimum radius of curvature $R_S$ of the support region 117. In a number of embodiments and $R_F$ can be $\leq 0.8 \ R_S$ such as $\leq 0.5 \ R_S$, $\leq 0.3 \ R_S$, or $\leq 0.1 \ R_S$. Further, $R_S$ can be $\leq$ infinity. It can be appreciated that $R_S$ can be within a range between and including any of the values for $R_S$ values described herein.

Figure 11:
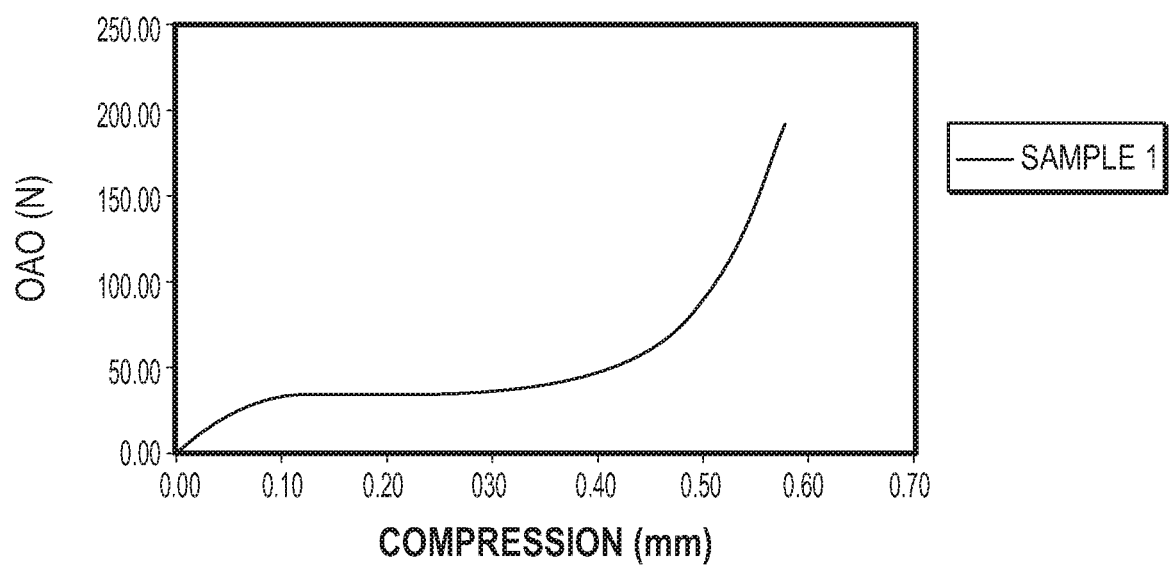
FIG. 11 includes a graph of the compression versus load by a bearing component or bearing according to an embodiment of the invention.

As shown in FIG. 11, a graph of the compression (mm) on the bearing component 114 or bearing 115 is shown versus the applied force (N). As shown in FIG. 11, the compression exhibits a steady force as compression is increased, indicating that the bearing component 114 or bearing 115 will maintain contact with the inner steering member 104 as compression is increased. Further, the bearing component 114 or bearing will be able to compensate for tolerance between the inner steering member 104 and the outer steering member 102 at various loads as shown.

In a number of embodiments, as the bearing component 114 or bearing 115 is disposed within the space or void between the inner steering member 104 and the outer steering member 102, the bearing component 114 or bearing 115 provides an interference fit or tolerance between these two components. The force applied by the bearing component 114 or bearing 115 against at least one of the inner steering member 104 or the outer steering member 102 helps maintain gear contact between the inner steering member 104 and the pinion 112 by overcoming the tolerance between the inner steering member 104 and the outer steering member 102. This force provides better performance of the steering assembly overall as the gears of the pinion 112 and the inner steering member 104 remain in contact.

Figure 6:
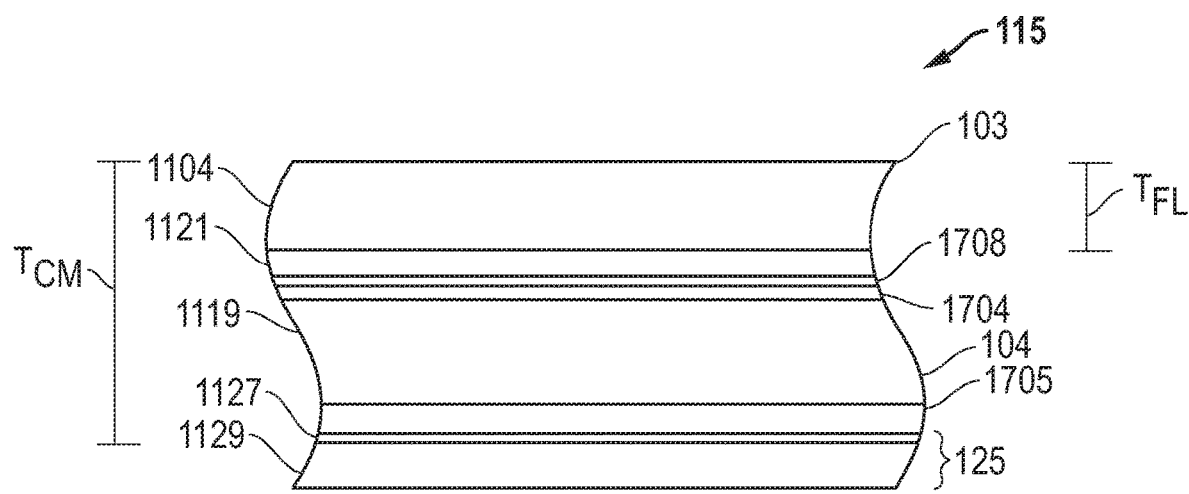
FIG. 6 includes a perspective view of a possible material composition for a bearing component or bearing according to an embodiment of the invention.

In a number of embodiments, as shown in FIG. 6, bearing 115 can include a composite material having a thickness $T_{CM}$. In a number of embodiments, bearing 115 may include a substrate 1119, which may be unitary (i.e. in a single piece). In one embodiment, the substrate 1119 may be formed of a single, continuous sheet of metal, and may be contoured such as by mechanical deformation such as stamping or punching. In other embodiments, the substrate 1119 may be in multiple pieces. In a number of embodiments, the substrate 1119 may include a metal strip. In a number of embodiments, bearing 115 may include a low friction layer 1104. The low friction layer 1104 can be coupled to at least a portion of the substrate 1119. In a particular embodiment, the low friction layer 1104 can be coupled to a surface of the substrate 1119 so as to form a low friction interface with another surface of another component. In a particular embodiment, the low friction layer 1104 can be coupled to the radially inner surface of the substrate 1119 so as to form a low friction interface with another surface of another component. In a particular embodiment, the low friction layer 1104 can be coupled to the radially outer surface of the substrate 1119 so as to form a low friction interface with another surface of another component (such as an inner steering member or outer member). The low friction layer 1104 can be coupled to both the radially inner surface and the radially outer surface of the substrate 1119.

In an embodiment, the substrate 1119 can at least partially include a metal, such as aluminum, zinc, copper, magnesium, tin, platinum, titanium, tungsten, iron, bronze, alloys thereof, or may be another type. More particularly, the substrate 1119 can at least partially include a steel, such as a stainless steel or spring steel. For example, the substrate can at least partially include a 301 stainless steel. The 301 stainless steel may be annealed, ¼ hard, ½ hard, ¾ hard, or full hard. The substrate 1119 may include a woven mesh or an expanded metal grid. Alternatively, the woven mesh can be a woven polymer mesh. In an alternate embodiment, the substrate 1119 may not include a mesh or grid. In another alternate embodiment, the substrate 1119, as a solid component, woven mesh or expanded metal grid, may be embedded between at least one adhesive layer 1121 included between the low friction layer 1104 and the substrate 1119. In at least one embodiment, the substrate 1119 may be any kind of metal alloy which provides an elastic behavior under application load in an arcuate shape.

Optionally, bearing 115 may include at least one adhesive layer 1121 that may couple the low friction layer 1103 to the substrate 1119. The adhesive layer 1121 may include any known adhesive material common to the ring arts including, but not limited to, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the substrate 1119 may be coated with corrosion protection layers 1704 and 1705 to prevent corrosion of bearing 115 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, bearing 115 may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the low friction layer 1104 of bearing 115 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness $T_{FL}$ in a range of 0.01 mm and 1.5 mm, such as in a range of 0.15 mm and 1.35 mm, or even in a range of 0.2 mm and 1.25 mm. In an embodiment, the thickness of the low friction 1104 may be uniform, i.e., a thickness at a first location of the low friction layer 1104 can be equal to a thickness at a second location therealong. In an embodiment bearing 115 may include a substrate 1119, which may be formed with the low friction layer 1104 at the outer side 109 of the sidewall 104. In an embodiment, bearing 115 may include a substrate 1119, which may be formed with the low friction layer 1104 on its surface. In a number of embodiments, the substrate 1119 may extend at least partially along a length of bearing 115. The substrate 1119 may be at least partially encapsulated by the low friction or low friction layer 1104. That is, the low friction or low friction layer 1104 may cover at least a portion of the substrate 1119. Axial ends of the substrate 1119 may or may not be exposed from the low friction or low friction layer 1104. In a particular embodiment, the substrate 1119 may be fully encapsulated in the low friction or low friction layer 1104 such that the substrate 1119 may not be visibly perceptible. In another embodiment, the substrate 1119 may include an aperture extending at least partially into the low friction or low friction layer 1104. The aperture can generally reduce stiffness of bearing 115, thereby allowing a specific engineered stiffness profile.

In an embodiment, any of the layers on bearing 115, as described above, can each be disposed in a roll and peeled therefrom to join together under pressure, at elevated temperatures (hot or cold pressed or rolled), by an adhesive, or by any combination thereof. In a number of embodiments, any of the layers of bearing 115, as described above, may be laminated together such that they at least partially overlap one another. In a number of embodiments, any of the layers on the bearing 115, as described above, may be applied together using a coating technique, such as, for example, physical or chemical vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate 1119. In another embodiment, the low friction layer 1104 may be cast or molded. In a number of embodiments, the bearing 115 may be stamped or punched or otherwise machined to achieve its final shape.

Figure 12A:
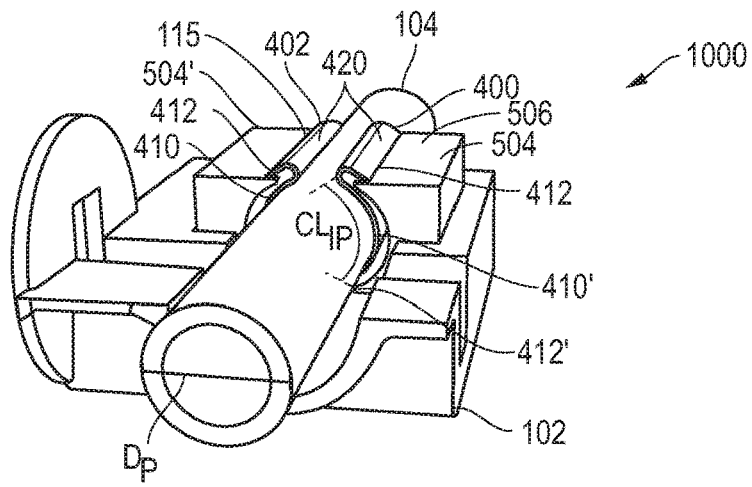
FIG. 12A includes a cross-sectional top plan view of a steering assembly in accordance with an embodiment.
Figure 12B:
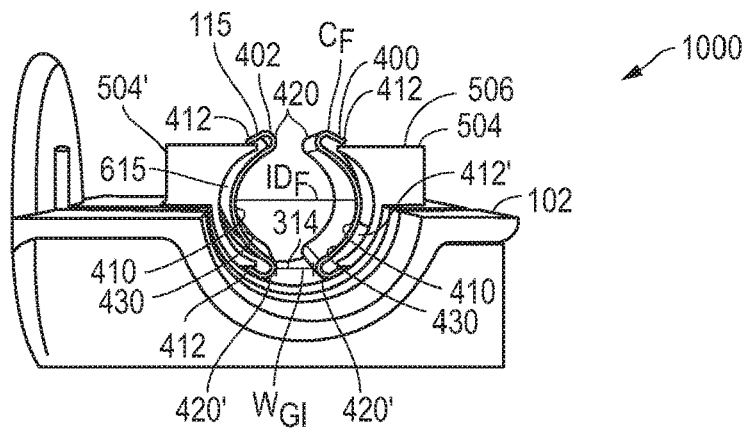
FIG. 12B includes a perspective end view of a steering assembly in accordance with an embodiment.
Figure 12C:
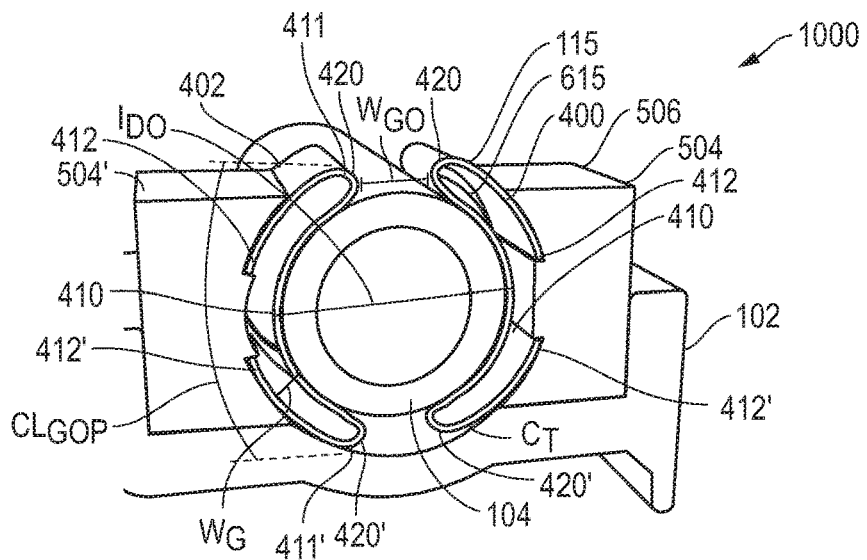
FIG. 12C includes a perspective end view of a steering assembly in accordance with an embodiment.

FIGS. 12A-12C illustrate a steering assembly including a bearing in accordance with a number of embodiments. Referring now to FIGS. 12A-12C, in a number of embodiments, the bearing 115 can include at least one leaf spring 400, 402 within a steering assembly 1000. The steering assembly 1000 may be substantially similar to the steering assembly 100 as previously described herein. The at least one leaf spring 400, 402 may include a composite material as described in FIG. 6 above. The at least one leaf spring 400, 402 may be adapted to bias or assist the inner steering member 104. The at least one leaf spring 400, 402 may be adapted to contact at least one of the inner steering member 104 or the outer steering member 102. In a number of embodiments, the bearing 115 may make contact with the inner steering member 104 with at least 90 degrees, such as at least 120 degrees, such as at least 150 degrees, such as at least 180 degrees, such as at least 210 degrees, such as at least 240 degrees, such as at least 270 degrees, such as at least 300 degrees, such as at least 330 degrees of the circumference $C_P$ of the inner steering member 104. In a number of embodiments, the at least one leaf spring 400, 402 may make contact with the inner steering member 104 with no greater than 345 degrees, such as no greater than 300 degrees, such as no greater than 270 degrees, such as no greater than 240 degrees, such as no greater than 210 degrees, such as no greater than 180 degrees, such as no greater than 150 degrees, such as no greater than 119 degrees of the circumference $C_P$ of the inner steering member 104. In a number of embodiments, the bearing 115 may make contact with the inner steering member 104 between about 120 degrees and 330 degrees of the circumference $C_P$ of the inner steering member 104.

Referring now to FIGS. 12A-12C, in a number of embodiments, each leaf spring 400, 402 can include an inner portion 410 and at least one outer portion 412. In a number of embodiments, each leaf spring 400, 402 can include a plurality of outer portions 412, 412'. In a number of embodiments, the outer portions 412, 412' may each include at least one end portion 420, 420'. In a number of embodiments, the end portions 420, 420' may be folded over such that the outer portions 412, 412' overlie the inner portion 410 in each leaf spring 400, 402 to form at least one folded edge 411, 411'. In a number of embodiments, each leaf spring 400, 402 can include two folded edges 411, 411'. In a number of embodiments, the folded edge 411, 411' of the end portions 420, 420' may form a gap 615 or void between the inner portion 410 and at least one of the outer portions 412, 412' of each leaf spring 400, 402. The gap 615 may form a gap distance $G_P$ between the inner portion 410 and at least one of the outer portions 412, 412' of each leaf spring 400, 402. As shown in FIGS. 12A-12C, each leaf spring 400, 402 can include a circumferential length of the inner portion 410, 410', $CL_{IP}$ between the two folded edges 411, 411'. As shown in FIGS. 12A-12C, each leaf spring 400, 402 can include a circumferential length of the outer portion 412, 412', $CL_{GOP}$ between the two end portions 420, 420'. In a number of embodiments, the circumferential length of the outer portion 412, 412', $CL_{GOP}$ may be up to 0.95 of a circumferential length of the inner portion 410, 410' $CL_{IP}$, such as up to 0.9 $CL_{IP}$, such as up to 0.85 $CL_{IP}$, or such as up to 0.8 $CL_{IP}$. The circumferential length of the outer portion 412, 412', $CL_{GOP}$ may be at least 0.1 of a circumferential length of the inner portion 410, 410' $CL_{IP}$, such as at least 0.15 $CL_{IP}$, or such as at least 0.2 $CL_{IP}$.

In a number of embodiments, at least one leaf spring 400, 402 can be locked or fixed to the outer steering member 102 via at least one locking component 504, 504'. In a number of embodiments, the locking component 504, 504' may be fixed to the outer steering member 102. In a number of alternative embodiments, the outer member 102 may include the locking component 500, 504'. In a number of embodiments, the locking component 504, 504' may include at least one adaptor block 506 that may be adapted to be fixed to the outer steering member 102. In a number of embodiments, the leaf spring 400, 402 can be locked in or fixed to the locking component 504, 504'. In a number of embodiments, the at least one leaf spring 400, 402 of the bearing 115 can be fixed to the outer steering member 102 or locking component 504, 504' by welding, adhesive, fasteners, threading, or any other suitable fastening means. The locking component 504, 504' (including the adaptor block 506) can include a polymer. The locking component 504, 504' (including the adaptor block 506) can include a metal or alloy thereof. In a particular embodiment, the locking component 504, 504' (including the adaptor block 506) can include a ceramic. In a particular embodiment, the locking component 504, 504' (including the adaptor block 506) can include a composite material including a polymer, metal, alloy, ceramic, or combination thereof.

As illustrated in FIG. 12B, in a particular aspect, the bearing 115 can have a functional inner diameter, $ID_F$, as measured between an of two opposite leaf springs 400, 402 prior to engagement with the inner steering member 104. As shown in FIG. 12A, the inner steering member 104 can comprise a diameter, $D_F$. In a particular aspect, a ratio of $D_F:ID_F$ can be no greater than 1.5, such as no greater than 1.45, no greater than 1.4, no greater than 1.35, no greater than 1.3, no greater than 1.25, no greater than 1.2, no greater than 1.15, no greater than 1.1, no greater than 1.05, or even no greater than 1.025. The ratio of $D_F$:$ID_F$ can be no less than 1.005, such as no less than 1.01, no less than 1.02, no less than 1.03, no less than 1.04, no less than 1.05, no less than 1.06, no less than 1.07, no less than 1.08, no less than 1.09, or even no less than 1.1.

As shown in FIG. 12B, the bearing 115 can further comprise a total circumference, $C_T$, which can be measured by a best fit circle along an inner surface 430 of the two leaf springs 400, 402 of the bearing 115 prior to insertion of the inner steering member 104 therein. In a particular embodiment, the bearing 115 can have an initial gap 314 between end portions 420, 420' of two leaf springs 400, 402 within the bearing 115. The initial gap 314 can be defined as the gap between end portions 420, 420' of two leaf springs 400, 402 prior to insertion of the inner steering member 104 into the bearing 115. The initial gap 314 can have an initial width, $W_{GI}$. A ratio of $W_{GI}$:$C_T$ can be no greater than 0.30, such as no greater than 0.25, no greater than 0.20, no greater than 0.15, no greater than 0.10, less than 0.05, or even less than 0.04. The ratio of $W_{GI}$:$C_T$ can be no less than 0.01, such as no less than 0.02, no less than 0.03, no less than 0.04, no less than 0.05, no less than 0.06, no less than 0.07, no less than 0.08, no less than 0.09, or even no less than 0.10. The ratio of $W_{GI}$:$C_T$ can also be within a range between and including any of the ratio values described above. As used herein, $C_T$ can be understood to include both the circumferential length of the inner surface 336 of the bearing 115 and the length, $W_{GI}$, of the gap 314.

Further, in a particular embodiment, upon insertion of inner steering member 104 into the bearing 115, the width between end portions 420, 420' of two leaf springs 400, 402 within the bearing 115 can increase to form an operational gap 338 having a width, $W_{GO}$. A ratio of $W_{GO}$:$W_{GI}$ can be no less than 0.01, such as no less than 0.02, no less than 0.03, no less than 0.04, no less than 0.05, no less than 0.10, no less than 0.15, no less than 0.20, no less than 0.25, no less than 0.30, no less than 0.35, or even no less than 0.40. The ratio of $W_{GO}$:$W_{GI}$ may be no greater than 0.75, such as no greater than 0.70, no greater than 0.65, no greater than 0.60, no greater than 0.55, no greater than 0.50, no greater than 0.45, no greater than 0.40, no greater than 0.35, no greater than 0.30, no greater than 0.25, no greater than 0.20, no greater than 0.15, no greater than 0.10, or even no greater than 0.05. The ratio of $W_{GO}$:$W_{GI}$ can also be within a range between and including any of the ratio values described above.

In a further embodiment, the bearing 115 can have an operational inner diameter, $ID_O$, which can be measured between the inner surface of the leaf springs 400, 402 after engagement of the bearing 115 with the inner steering member 104. In a particular aspect, a ratio of $ID_O$:$ID_F$ can be no less than 1.05, such as no less than 1.10, no less than 1.15, no less than 1.20, no less than 1.25, no less than 1.30, no less than 1.35, no less than 1.40, no less than 1.45, no less than 1.50, no less than 1.55, or even no less than 1.60. The ratio of $ID_O$:$ID_F$ can be no greater than 2.00, such as no greater than 1.75, no greater than 1.50, no greater than 1.25, or even no greater than 1.10. The ratio of $ID_O$:$ID_F$ can also be within a range between and including any of the ratio values described above.

In a particular aspect, the bearing 115 can have a functional circumference, as measured by a best fit circle along the undeformed portion of the bearing 115 after insertion of the inner steering member 104 therein. A ratio of $C_T$:$C_F$ can be at least 1.025, at least 1.05, at least 1.1, at least 1.2, at least 1.3, at least 1.4, at least 1.5, at least 1.75, or even at least 2.0. The ratio of $C_T$:$C_F$ can be less than 5, less than 4, less than 3, less than 2, or even less than 1.5. The ratio of $C_T$:$C_F$ can also be within a range between and including any of the ratio values described above.

In a particular embodiment, the bearing 115 can be adapted to apply a radially inward force against the inner steering member 104 so as to form a "zero-clearance" fit therebetween. In this regard, a zero-clearance fit can be formed between the bearing 115 and the inner steering member 104. As used herein, the term "zero-clearance" is defined by an engagement between a bearing and an inner steering member 104 substantially devoid of perceptible radial play or movement upon application of a force against the bearing 115 perpendicular to the central axis of the bearing 115.

In a particular aspect, it may be desirable for the bearing 115 to provide a high degree of radial stiffness to the inner steering member 104 while simultaneously permitting low axial sliding forces of the inner steering member 104 within the bearing 115. In this regard, the assembly can support high normal loads while simultaneously permitting translation of the inner steering member 104 within the bearing 115 upon application of a minimal axial load.

In a particular embodiment, the bearing 115 can form an interference fit with the inner steering member 104 such that the bearing 115 can provide the inner steering member 104 with a radial stiffness of no less than about 2,000 N/mm while simultaneously allowing the inner steering member 104 to translate upon an axial sliding force of no greater than about 30 N. In further embodiments, the bearing 115 can provide the inner steering member 104 with a radial stiffness of no less than about 2,250 N/mm, no less than about 2,500 N/mm, no less than about 2,750 N/mm, no less than about 3,000 N/mm, no less than about 3,500 N/mm, or no less than about 4,000 N/mm. Radial stiffness of the bearing 115 can be measured after insertion of the inner steering member 104 in the bearing 115. For example, after the inner steering member 104 has been inserted into the bearing 115 as previously described, the radial stiffness of the inner steering member 104 and bearing 115 preassembly can be determined by fixing one of the inner steering member 104 or the bearing 115 and applying a perpendicular normal force to the other one of the inner steering member 104 or the bearing 115. The force necessary to affect radial movement of one of the inner steering member 104 or bearing 115 can be determinative of the radial stiffness of the bearing 115.

In particular embodiments, the bearing 115 can provide a desired radial stiffness while simultaneously permitting axial translation of the inner steering member 104 therein upon application of an axial sliding force of no greater than about 29 N, no greater than about 28 N, no greater than about 27 N, no greater than about 26 N, no greater than about 25 N, no greater than about 24 N, no greater than about 23 N, no greater than about 22 N, no greater than about 21 N, no greater than about 20 N, no greater than about 19 N, no greater than about 18 N, no greater than about 17 N, no greater than about 16 N, no greater than about 15 N, no greater than about 14 N, no greater than about 13 N. In this regard, the bearing 115 can provide an affective resistance to radial movement while permitting axial translation of the inner steering member 104 upon application of a minimal longitudinal force.

In this regard, in particular embodiments, the bearing 115 can have an assembled radial stiffness of no less than about 1,000 N/mm while requiring an initial assembly force of no greater than about 100 N. In further embodiments, the bearing 115 can have an assembled radial stiffness of no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the bearing 115 can have an assembled radial stiffness of no greater than about 7500 N/mm, such as no greater than about 7000 N/mm, no greater than about 6500 N/mm, no greater than about 6000 N/mm, no greater than about 5500 N/mm, or even no greater than about 5000 N/mm. Moreover, the assembled radial stiffness of the bearing 115 can also be within a range between and including any of the values described above, such as, for example, between about 4500 N/mm and about 4800 N/mm. In particular embodiments the bearing 115 can be adapted to have an assembled radial stiffness within the range described above while simultaneously having an assembly force of no greater than about 100 N, such as no greater than about 95 N, no greater than about 90 N, no greater than about 85 N, no greater than about 80 N, or even no greater than about 75 N.

According to various embodiments herein, steering assemblies are provided that may eliminate the need for a traditional steering yoke assembly. According to various embodiments herein, steering assemblies are provided that may provide more consistent contact between an inner steering member 104 and the pinion 112. According to various embodiments herein, steering assemblies are provided that may provide a more stable performance of the steering assembly over the lifetime of its use. According to various embodiments herein, steering assemblies are provided that may eliminate additional parts, installation and manufacturing time, and provide easier use for steering assemblies. According to various embodiments herein, bearing components may be used as a drop in solution, providing minimal modifications to existing steering assemblies. According to various embodiments herein, bearing components may eliminate or lessen noises due to damping aspects within steering assemblies.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A steering assembly comprising: an inner steering member; an outer steering member; a leaf spring disposed between the inner steering member and the outer steering member and adapted to bias the inner steering member, wherein the leaf spring comprises an inner portion and a plurality of outer portions, wherein the outer portions comprise end portions of the leaf spring that are folded over such that the outer portions overlie the inner portion, forming a folded edge; and a low friction layer supported by the leaf spring.

Embodiment 2

The assembly of embodiment 1, wherein the low friction layer contacts at least one of the inner steering member or the outer steering member.

Embodiment 3

The assembly of embodiment 1, wherein the low friction layer forms a low friction interface with at least one of the inner steering member or the outer steering member.

Embodiment 4

The assembly of embodiment 1, wherein the leaf spring comprises a gap between the inner portion and the outer portions.

Embodiment 5

The assembly of embodiment 1, wherein the leaf spring includes a circumferential length of the inner portion, $CL_{IP}$, between the folded edges, and a circumferential length of the outer portion, $CL_{GOP}$, between the end portions, and wherein $CL_{GOP}$ is up to 0.95 of $CL_{IP}$.

Embodiment 6

The assembly of embodiment 1, wherein the bearing exerts a force of greater than 50 N to bias the inner steering member.

Embodiment 7

The assembly of embodiment 1, wherein the inner steering member comprises a plurality of teeth.

Embodiment 8

The assembly of embodiment 1, wherein the low friction layer comprises a polymer.

Embodiment 9

The assembly of embodiment 1, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

Embodiment 10

The assembly of embodiment 1, wherein the leaf spring further comprises a substrate underlying the low friction layer.

Embodiment 11

The assembly of embodiment 10, wherein the substrate comprises a metal.

Embodiment 12

The assembly of embodiment 10, wherein the substrate comprises stainless steel or spring steel.

Embodiment 13

The assembly of embodiment 10, wherein the leaf spring further comprises a second low friction layer overlying the substrate.

Embodiment 14

The assembly of embodiment 10, wherein the leaf spring further comprises an adhesive layer disposed between the substrate and the low friction layer.

Embodiment 15

The assembly of embodiment 14, wherein the adhesive layer comprises epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof.

Embodiment 16

The assembly of embodiment 1, wherein the bearing makes contact with the inner steering member between 120 and 330° of the circumference of the inner steering member.

Embodiment 17

The assembly of embodiment 1, wherein the inner steering member comprises a metal or alloy thereof.

Embodiment 18

The assembly of embodiment 1, wherein the outer steering member comprises a polymer.

Embodiment 19

The assembly of embodiment 1, wherein the leaf spring is fixed to the outer steering member.

Embodiment 20

The assembly of embodiment 1, wherein the inner steering member is adapted to translate relative to the outer steering member.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A steering assembly comprising:
   an inner steering member;
   an outer steering member;
   a leaf spring disposed between the inner steering member and the outer steering member and adapted to bias the inner steering member, wherein the leaf spring comprises an inner portion and a plurality of outer portions, wherein the outer portions comprise end portions of the leaf spring that are folded over such that the outer portions overlie the inner portion, forming a folded edge; and
   a low friction layer supported by the leaf spring, wherein the leaf spring includes a circumferential length of the inner portion, $CL_{IP}$, between the folded edges, and a circumferential length a respective one of the outer portions, $CL_{GOP}$, between the respective end portions, and wherein $CL_{GOP}$ is up to 0.95 of $CL_{IP}$.

2. The assembly of claim 1, wherein the low friction layer contacts at least one of the inner steering member or the outer steering member.

3. The assembly of claim 1, wherein the low friction layer forms a low friction interface with at least one of the inner steering member or the outer steering member.

4. The assembly of claim 1, wherein the leaf spring comprises a gap between the inner portion and the outer portions.

5. The assembly of claim 1, wherein the inner steering member comprises a plurality of teeth.

6. The assembly of claim 1, wherein the low friction layer comprises a polymer.

7. The assembly of claim 1, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, or a combination thereof.

8. The assembly of claim 1, wherein the leaf spring further comprises a substrate underlying the low friction layer.

9. The assembly of claim 8, wherein the substrate comprises a metal.

10. The assembly of claim 8, wherein the substrate comprises stainless steel or spring steel.

11. The assembly of claim 8, wherein the leaf spring further comprises a second low friction layer overlying the substrate.

12. The assembly of claim 8, wherein the leaf spring further comprises an adhesive layer disposed between the substrate and the low friction layer.

13. The assembly of claim 12, wherein the adhesive layer comprises epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof.

14. The assembly of claim 1, wherein the leaf spring makes contact with the inner steering member between 120 and 330° of a circumference of the inner steering member.

15. The assembly of claim 1, wherein the inner steering member comprises a metal or alloy thereof.

16. The assembly of claim 1, wherein the outer steering member comprises a polymer.

17. The assembly of claim 1, wherein the leaf spring is fixed to the outer steering member.

18. The assembly of claim 1, wherein the inner steering member is adapted to translate relative to the outer steering member.

19. A steering assembly comprising:
   an inner steering member;
   an outer steering member;
   a leaf spring disposed between the inner steering member and the outer steering member and adapted to bias the inner steering member, wherein the leaf spring comprises an inner portion and a plurality of outer portions, wherein the outer portions comprise end portions of the leaf spring that are folded over such that the outer portions overlie the inner portion, forming a folded edge; and
   a low friction layer supported by the leaf spring, wherein the leaf spring exerts a force of greater than 50 N to bias the inner steering member.

* * * * *